(12) United States Patent
Ruf et al.

(10) Patent No.: US 11,965,588 B2
(45) Date of Patent: Apr. 23, 2024

(54) GEARWHEEL WITH SUPPORTING STRUCTURE

(71) Applicant: HIRSCHVOGEL UMFORMTECHNIK GMBH, Denklingen (DE)

(72) Inventors: Roland Ruf, Landsberg am Lech (DE); Johannes Grimm, Bad Wurzach (DE); Gordon Triesch, Kaufering (DE)

(73) Assignee: HIRSCHVOGEL UMFORMTECHNIK GMBH, Denklingen (DE)

( * ) Notice: Subject to any disclaimer, the term of this patent is extended or adjusted under 35 U.S.C. 154(b) by 197 days.

(21) Appl. No.: 17/325,575

(22) Filed: May 20, 2021

(65) Prior Publication Data

US 2021/0364078 A1 Nov. 25, 2021

(30) Foreign Application Priority Data

May 22, 2020 (DE) .................... 10 2020 113 800.8

(51) Int. Cl.
*F16H 55/08* (2006.01)
*F16H 55/22* (2006.01)
(Continued)

(52) U.S. Cl.
CPC ............ *F16H 55/22* (2013.01); *F16H 55/08* (2013.01); *F16D 2001/103* (2013.01); *F16H 48/08* (2013.01); *F16H 48/38* (2013.01)

(58) Field of Classification Search
CPC ............ F16H 48/08; F16H 55/08; F16H 55/22
See application file for complete search history.

(56) References Cited

U.S. PATENT DOCUMENTS 3,605,518 A * 9/1971 Haller ................. F16H 55/0846
74/459.5
4,308,760 A 1/1982 Voigtlander et al.
(Continued)

FOREIGN PATENT DOCUMENTS

DE 2910981 A1 10/1980
DE 19958670 A1 8/2000
(Continued)

OTHER PUBLICATIONS

German Office Action for German Patent Application Serial No. 10 2020 113 800.8, dated Nov. 16, 2020, 7 pages.

*Primary Examiner* — William C Joyce
(74) *Attorney, Agent, or Firm* — MUETING RAASCH GROUP

(57) ABSTRACT

A gearwheel includes a gearwheel body with teeth arranged around its rotational axis. Two adjacent teeth are connected to one another at their tooth roots via a tooth base. The gearwheel includes a supporting structure which has a supporting region at least one or both axial ends of the respective tooth base, which supporting region extends away from the tooth base between the respective adjacent teeth. The supporting regions are connected directly to the adjacent teeth and the tooth base in each case by way of a transition region. The respective transition region surrounds the supporting region in a manner which extends at least partially and contiguously and has a transition geometry in cross section as viewed in the direction of its extent. A geometric variable of the said transition geometry changes steadily, depending on the supporting region, along an axial and/or radial direction with regard to the rotational axis.

16 Claims, 9 Drawing Sheets

(51) Int. Cl.
    *F16D 1/10*     (2006.01)
    *F16H 48/08*     (2006.01)
    *F16H 48/38*     (2012.01)

(56) References Cited

U.S. PATENT DOCUMENTS

| | | | |
|---|---|---|---|
| 6,732,605 B2 | | 5/2004 | Takano et al. |
| 9,267,594 B2 | * | 2/2016 | Benedict ................. F16H 55/17 |
| 2017/0114882 A1 | * | 4/2017 | Hirao ................. F16H 55/0813 |

FOREIGN PATENT DOCUMENTS

| | | | |
|---|---|---|---|
| DE | 60204382 T3 | | 10/2005 |
| EP | 14 249 641 | * | 10/2002 |
| WO | 2007118522 A1 | | 10/2007 |
| WO | WO 2014/184901 | * | 11/2014 |

\* cited by examiner

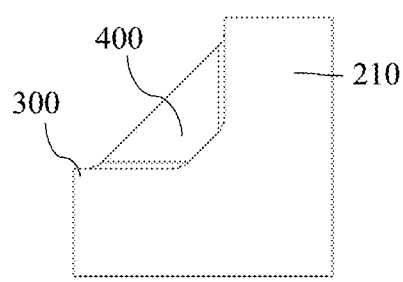
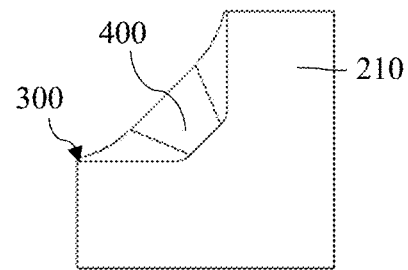
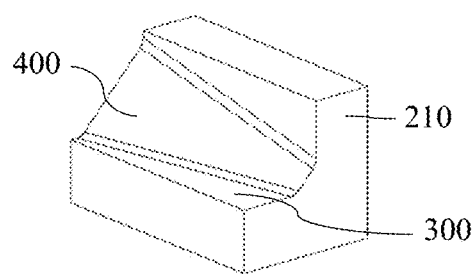
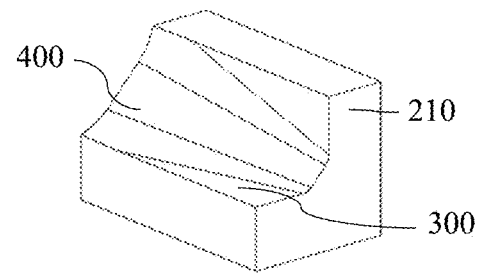
FIG 11D
FIG 11E
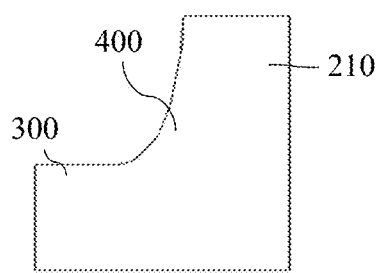
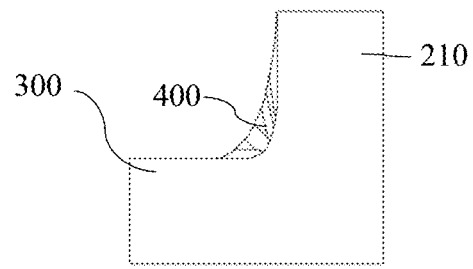
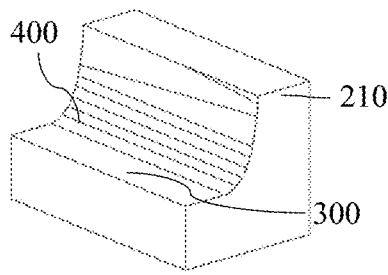
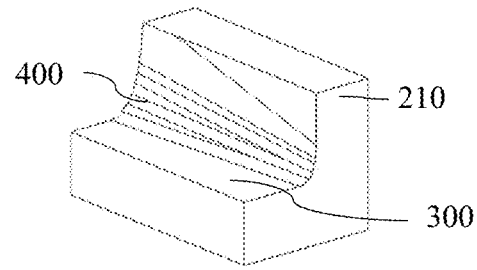
FIG 11F
FIG 11G Prior Art

GEARWHEEL WITH SUPPORTING STRUCTURE

RELATED APPLICATIONS

This application claims priority to German Patent Application Serial No. 10 2020 113 800.8, filed May 22, 2020, the disclosure of which is incorporated herein by reference.

SUMMARY

The present invention relates to a gearwheel with teeth which are arranged distributed around its rotational axis. The gearwheel has a supporting structure, which at at least one or both axial (with regard to the rotational axis) ends of the respective tooth base has a supporting region that extends away from the tooth base between the adjacent teeth. Furthermore, the invention relates to a differential gear with a gearwheel of this type.

It is known from the prior art for the strength and product service life of gearwheels to be influenced by means of their structural configuration. To this end, for example, ribs or reinforcing structures of another type are provided on the gearwheel.

It is thus known, for example, for a reinforcing structure to be provided in each case on at least one of the end sections of a tooth gap, by means of which reinforcing structure the mechanical loading of the teeth can be distributed in the component in an improved manner in the operating state. Here, the extent of the reinforcing structures between the teeth of the gearwheel can impart the appearance of "webbed areas" to the reinforcing structures.

For illustration purposes, FIG. 12 shows a gearwheel (800) of this type which is known from the prior art and has corresponding reinforcing structures (830). The reinforcing structures (830) can counteract material fatigue and an occurrence of cracks in the tooth roots (without reference signs) of the teeth (821), and the service life and the load-bearing capability of the gearwheel (800) can therefore be increased.

It is a disadvantage of known solutions of this type that material fatigue and cracks are counteracted principally by the gearwheel and the reinforcing structures which are provided on it being of massive configuration and dimensions. This can lead to a weight increase and an increased installation space requirement of gearwheels of this type. This is problematic, however, in applications, in particular, in the case of which the installation space is in any case limited and, furthermore, the component weight has a significant influence on the efficiency and inertia of the overall system, as is the case, for example, in automotive engineering.

FIG. 12 shows a sharp edge (840) as a transition of the reinforcing structure (830) to the teeth (821). Furthermore, gearwheels are also found in the prior art, in the case of which gearwheels the transition of a corresponding reinforcing structure to the teeth is formed by way of a constant radius which is often relatively small in comparison to the further gearwheel dimensions.

It has been shown, however, that stress concentrations occur in the reinforcing structure precisely as a result of structure transitions of this type (sharp edges, constant radii), and the service life and load-bearing capability of the gearwheel are thus limited. Up to now, these disadvantageous effects have also been addressed in the prior art by virtue of the fact that the reinforcing structures have massive dimensions, with the result that the installation space requirement of the gearwheel increases further and the gearwheel weight is increased further.

It is therefore an object of the present invention to provide a gearwheel and, furthermore, a differential gear, by way of which the abovementioned disadvantages which are known from the prior art can be overcome.

In particular, it is an object of the present invention to provide a gearwheel and a differential gear, the service life, mechanical rigidity and load-bearing capability of which are increased respectively, in the case of which, furthermore, the mechanical stresses which occur in the gearwheel during the operation are reduced and are distributed uniformly, and which can additionally be used for a multiplicity of different applications, a weight increase and an increased complexity in the production of the gearwheel and/or the differential gear being avoided despite the functional increase.

This object is achieved in each case by way of the subject matter of the independent claims. The dependent claims develop the central concept of the present invention in a particularly advantageous way.

A first aspect of the present invention relates to a gearwheel with a rotational axis, which gearwheel has a gearwheel body with teeth which are arranged distributed around the rotational axis, in each case two adjacent teeth being connected to one another at their tooth roots via a tooth base.

Furthermore, the gearwheel has a supporting structure which has a supporting region at at least one or both axial (with regard to the rotational axis) ends of the respective tooth base, which supporting region extends away from the tooth base between the respective adjacent teeth.

Here, the supporting regions are connected directly to the adjacent teeth and to the tooth base in each case by way of a transition region.

Here, for example, the term "direct connection" can be understood in such a way that, in particular, there is a direct connection between the gearwheel structures which are to be connected to one another, that is to say, for example, a connection of the two structures without the provision (or interposition) of an (additional) intermediate structure.

Here, the respective transition region surrounds the supporting region at least partially and in a contiguously extending manner.

Here, for example, the term "contiguous extent" can be understood in such a way that the extent is continuous/continual, that is to say, for example, no interruptions of the structure occur along its extent.

Here, the transition has a transition geometry in cross section as viewed in the direction of its extent.

Here, for example, the "direction of the extent of the transition region" can be understood to mean a direction, along which the respective transition region preferably extends in a contiguous manner. The "direction of the extent of the transition region" can, for example, also a direction which runs transversely with respect to the extent of the respective transition region between the corresponding supporting region and the respective tooth or the tooth base. Furthermore, this direction can also be a main extent direction of the respective transition region, for example can be a direction, by way of which the direction of the extent of the transition region can be described as satisfactorily as possible in three-dimensional space (as viewed locally/over the entire transition region).

For example, the term "transition geometry" can be understood to mean a geometry which defines the change of a first structure to a second structure in structural terms (in terms of its shape), that is to say, for example, a geometry which is composed, for example, of straight lines, curves and/or angles or has merely one of these elements. Here, the transition geometry can preferably also be a geometry which is composed in the contiguous manner from a plurality of geometric basic constituent parts of this type.

Here, according to the invention, a geometric variable of this transition geometry changes per supporting region along an axial and/or radial direction with regard to the rotational axis; preferably steadily.

The term "geometric variable" can be understood, for example, to mean a dimension, an arc length, a curvature or a turn of geometry sections (geometry elements) or curves which are contained in the transition geometry. This list is purely by way of example.

The term "steady change" can be understood, for example, in such a way that a change continues over the entire region as viewed along the axial radial direction, or this change is present even if part regions with no change might be present along the axial or radial direction. Thus, for example, it can be understood to be a steady change if the respective geometric variables of two transmission geometries of the same transition region which are present at two different (in the axial and/or radial direction) points (and possibly follow one another directly) are different from one another. For example, a "steady change of the geometric variable" might also be understood to mean that regions with a changing geometric variable are interrupted by sections, in which the geometric variable remains unchanged (that is to say, for example, decreasing—constant—decreasing). As an alternative or in addition, a "steady change" can also be understood in the mathematical sense. The geometric variable can thus change continuously along the axial and/or radial direction with regard to the rotational axis, in such a way that the change sequence of the geometric variable does not have any jumps, it preferably also being possible here for sections with no change along the axial or radial direction to be present.

An "axial and/or radial direction with regard to the rotational axis" can be understood, for example, in such a way that the described direction has at least components in the corresponding direction parallel (axially) or perpendicularly (radially) with respect to the rotational axis, that is to say, an "axial direction" preferably runs parallel or obliquely with respect to the rotational axis, a "radial direction" runs perpendicularly or obliquely with respect to the rotational axis, and an "axial and radial direction" runs obliquely with respect to the rotational axis.

In other words, the invention can therefore be described, for example, as follows:

A gearwheel which is to be rotated about a rotational axis is provided with teeth, in each case two teeth being connected to one another via a (common) tooth base. Here, in particular, relatively high torques can be transmitted, for example, by means of the configuration according to the invention of the gearwheel.

Furthermore, the gearwheel has a supporting structure. By means of the supporting structure, the rigidity of the gearwheel can be increased and/or the stresses which occur in the gearwheel can be reduced, for example, during operation.

Here, the supporting structure has a supporting region in each case at at least one or else at both axial (with regard to the rotational axis) ends of the tooth base of two adjacent teeth. The supporting structure can therefore be provided, for example, in each case in the tooth gap which is formed between two adjacent teeth. The supporting structure can preferably be arranged in this way in each tooth gap of the gearwheel. Therefore, the supporting structure can be provided on the gearwheel in a particularly advantageous manner. Therefore, the gearwheel can be constructed to be smaller and of lightweight design, with the result that reduced packaging can be achieved. By way of the positioning at the respective axial ends of the tooth base, it is made possible at the same time for that surface of the teeth which is available for meshing to be restricted as little as possible by way of the supporting structure, since a space which is free in any case is utilized for the provision of supporting structures.

The supporting region extends away from the tooth base between the respective adjacent teeth. Therefore, the supporting region can extend away from the tooth base, for example, along a radial and/or axial direction with regard to the rotational axis, in order, for example, to increase the diameter (critical for the loading) of the gearwheel and preferably to increase the rigidity of the gearwheel in this way.

Here, the supporting regions are connected in each case directly (that is to say, for example, immediately) by way of a transition region to the adjacent teeth and the tooth base. The transition region can therefore be limited, for example, in its extent by way of the teeth and the supporting structure. As a consequence, a defined structure transition can be provided between the respective tooth and the supporting structure by way of the transition region. Here, the transition region can be provided as an original structure of the gearwheel and/or as a stand-alone or independent structure of the gearwheel. Here, the transition region can be a structure of the gearwheel, which structure is exposed towards the outside and/or can be seen from the outside. The transition region can preferably extend between edge sections and/or face sections of the teeth and/or the supporting structure, which sections can indicate, for example, a change from one of the structures to the other one of the structures.

Here, the respective transition region surrounds the supporting region at least partially and in a contiguously extending manner, and has a transition geometry in cross section as viewed in the direction of its extent. The transition geometry can preferably have substantially the same geometry elements or geometry constituent parts along the axial and/or radial direction.

Here, a geometric variable of this transition geometry changes per supporting region along an axial and/or radial direction with regard to the rotational axis (preferably in a steady manner, that is to say, for example, in a continuous manner). Here, (merely/at least) one geometry parameter can preferably change along the axial and/or radial direction with regard to the rotational axis, which geometry parameter is relevant for the dimensioning of at least one (preferably always the same) constituent part of the transition geometry, preferably a constituent part which defines the transition geometry. The geometric variable of the respective transition geometry can preferably change only along a single axial and/or radial direction with regard to the rotational axis. The axial direction can be, for example, parallel to the rotational axis. The radial direction can be, for example, perpendicular with respect to the rotational axis. The axial and/or radial direction can preferably be oriented in each case towards the centre of the gearwheel.

Therefore, for example, the structural transition (shown in cross section) from the respective tooth to the respective supporting structure can preferably be continuously different on account of the (possibly individually) varying transition geometry of each transition region (for example, considered globally). This allows, for example, the transition of the tooth to the supporting structure to be designed in such a way that the shape of the gearwheel is adapted to the mechanical loads which occur during operation. In this way, loads of the gearwheel, force flows, elongations and/or stresses in the gearwheel can take place in as uniform (ly distributed) a manner as possible. Furthermore, stress concentration effects which emanate from the supporting structure, such as stress peaks in the abovementioned structure transition, can be reduced. In this way, it can be achieved, for example, that the maximum stress is reduced considerably in the supporting structure in comparison with a gearwheel without a transition region of this type. For example, simulations have been able to show that a reduction of the magnitude of the stress maximum of at least up to 50% and more for a gearwheel with the transition region in comparison with a gearwheel which is loaded equally without a transition region of this type can be achieved. Furthermore, it becomes possible for the gearwheel to be of thicker dimensions only at the points, at which an increased stress is to be expected. In this way, the weight of the gearwheel can be reduced. At the same time, more clearance for meshing the gearwheel with a mating gearwheel can be provided in the tooth gap, with the result that the gearwheel does not have to be of greater dimensions despite the provision of the supporting structure.

In this way, the disadvantages which are known from the prior art are overcome by way of the invention, by a gearwheel being provided, by way of which, for example, a torque and power can be transmitted via the teeth to other gearwheels in a gear mechanism. Here, the gearwheel not only has a first structure element (namely the supporting structure), by way of which the rigidity of the gearwheel can be increased and the stresses which occur in the gearwheel during operation can be absorbed in an improved manner, but rather it additionally has a further variable, structural design element (namely the transition region), by way of which the structural transition from the teeth to the supporting structure is defined.

In accordance with one preferred embodiment, the transition geometry can have at least one geometry section which is defined by way of the geometric variable. The transition geometry can preferably have merely a single geometry section of this type. The transition geometry or the geometry section can preferably be a rounded portion, such as a radius or a concave curvature, and/or bevelled edge, such as a chamfer, and/or a sectioned boundary which is defined in accordance with its shape (in accordance with a polynomial function).

The transition geometry can preferably have at least one radius and/or one chamfer.

Here, for example, the terms "radius" or "chamfer" can be understood in each case (in the sense of an extent) as defined structure elements for preferable rounding of corners or edges, in particular on a transition base, such as the tooth base.

In this way, the transition geometry can be defined by way of one or more (composite) geometry section/sections, and the structure transition can thus be adapted, for example, according to a load of the gearwheel. In particular, the abovementioned examples for possible embodiments of geometry sections are suitable for reducing a stress concentration which is brought about by way of an abrupt structure transition. Furthermore, the production of the gearwheel is simplified since the respective geometry sections can be implemented with low production complexity. Here, in particular, efficiency advantages can be achieved in the forming process, and the service life of the tools which are used in the process can be increased.

In accordance with one further preferred refinement, the geometric variable can be a curvature extent, a curvature increase, a radius, and/or a width or an angle of a bevelled edge, in particular a chamfer.

Here, for example, the term "radius" can be understood to mean half the magnitude of the circle diameter which is provided for edge rounding, and/or to mean the spacing between the centre point of an imaginary circle which is used for edge rounding and the respective geometry section.

In this way, the transition geometry can be provided in a defined manner, and an adaptation thereof to the load of the gearwheel can take place. Furthermore, a stress concentration which is brought about by way of the supporting structure can be reduced or prevented by way of the defined specification and variation of the curvature increase, the radius and/or the chamfer angle.

In accordance with one preferred refinement, the geometric variable can change equally, such as, for example, can decrease and/or increase equally, along the axial and/or radial direction with regard to the rotational axis. Here, in particular, the geometric variable can change in a steady and/or continuous manner.

Here, for example, the term "continuously" can be understood to mean "uniformly" and/or "continuing in an uninterrupted manner".

In this way, it is possible for the structure transition between the respective gearwheel structures to be provided in as flowing a manner as possible along the extent of the transition region, with the result that an improvement of the force flow and a reduction of stress peaks are achieved.

In accordance with a further preferred embodiment, the transition region can in each case have a first section for the direct connection between the respective supporting region and a first one of the adjacent teeth. Furthermore, the transition region can have a second section for the direct connection between the supporting region and a second one of the adjacent teeth. In addition, the transition region can have a third section which connects the first and second section for the direct connection between the supporting region and the tooth base which connects the first and second tooth.

The respective transition region can preferably in each case have a substantially U-shape, V-shape and/or parabola shape. The respective shape of the respective transition region can be configured in such a way that it is preferably open towards that axial end of the tooth base which has the transition region and/or preferably towards the radial (with regard to the rotational axis) outer circumference of the gearwheel.

Here, the geometric variable can preferably decrease continuously (and/or in a steady manner) along the direction of the extent from the first section towards the third section. Furthermore, the geometric variable can preferably decrease continuously (and/or in a steady manner) along the direction of the extent from the second section towards the third section. As an alternative or in addition, the geometric variable can in each case also change continuously (and/or in a steady manner) on a connecting section of the respective first or second section to the third section.

The geometric variable of the transition geometry of the respective transition region can preferably change equally steadily along the axial and/or radial (with regard to the rotational axis) direction on sides which lie opposite one another with regard to the respective supporting region.

As a result, it becomes possible for the stress to be directed from the loaded tooth base of the teeth to the supporting structure gently in such a way that a stress concentration is brought about primarily in the supporting structure. This is designed specifically for stress concentrations of this type, with the result that a material failure in other structures of the gearwheel can be prevented. Furthermore, on account of its opening towards the edge of the gearwheel, the transition region is wider along the outer fibres of the gearwheel than in the fibres which lie closer to the tooth base, with the result that the transition structure can develop the greatest influence on the direction and concentration of the stresses in the component. In this way, the strength of the gearwheel can additionally be increased. In addition, a continuous tapering transition towards the gearwheel centre can be achieved, in order in this way to deflect stresses which occur in the gearwheel in as gentle a manner as possible in order to prevent stress peaks.

In accordance with one preferred embodiment, the respective supporting region can change steadily and/or continuously in terms of its size, for example can decrease, axially (with regard to the rotational axis) away from that axial end of the tooth base which has the said supporting region towards the opposite axial end.

Further preferably, the respective supporting region can extend axially (with regard to the rotational axis) away from that axial end of the tooth base which has the said supporting region towards the opposite axial end over a length of at most a third, preferably a quarter, of the axial length of the tooth base.

In this way, the supporting region can be provided between the teeth on the tooth base in such a way that the area which is available on the tooth flanks for meshing is not restricted in the process. At the same time, a weight increase of the gearwheel can be avoided. Furthermore, a gearwheel can be provided with a corresponding supporting structure and can be produced in a particularly simple manner on account of this refinement.

In accordance with one preferred embodiment, the respective supporting region can extend flatly between the respective adjacent teeth.

Here, the term "flat extent" can be directed, for example, to an extent which forms an area (to a substantial extent to/to a predominant extent, that is to say, for example, at least 50%, 60%, 70%, 80%, 90% or 95% with regard to the overall extent of the respective supporting region).

A planar extent of the respective supporting region can achieve a situation where the space which is available in the tooth gap for meshing is constricted as little as possible by way of the supporting structure, and at the same time merely a small mass increase is registered on the gearwheel as a result of the provision of the supporting structure. The stress which occurs can also be dissipated over a great area as a result of the flat extent.

In accordance with a further preferred embodiment, the respective supporting region can be provided at the corresponding axial end of the tooth base in such a way that a circumferential edge of the gearwheel, which circumferential edge runs around with the circumference of the gearwheel and is preferably exposed to the outside, is formed jointly by the respective supporting region (and by the transition region) and by the adjacent teeth.

In this way, the diameter of the gearwheel can be increased at its axial ends by way of the supporting structure, without necessitating an overall increase in size in the gearwheel in the process. In particular, the tooth base can be enclosed completely by gearwheel structures in this way. As a result, stresses which occur precisely at the gearwheel ends can be absorbed and distributed particularly advantageously. A direct support of two adjacent teeth in each case on one another can also be brought about in this way, with the result that a reinforcement of the gearwheel structure is achieved and the respective tooth roots are loaded to a lesser extent. In addition, the production of the gearwheel is simplified since the supporting structure extends from an outer circumferential edge into the gearwheel body.

In accordance with one preferred embodiment, the supporting structure (or, in particular, the respective supporting region) can be delimited at least partially by way of the transition region (which surrounds it). In addition or as an alternative, the supporting structure (in particular, the respective supporting region) can preferably be delimited by way of an outer circumferential edge of the gearwheel, such as, for example, the abovementioned circumferential edge.

As a result, the supporting structure and the transition region can be provided on the gearwheel in a manner which is defined and adapted in each case to one another, with the result that the two structure elements are provided in a manner which is adapted to one another in each case for the load which occurs during operation. In this way, not only can the force flow between the teeth and the transition region be optimized and any stress concentration effects reduced, but rather the transition of the transition region and the supporting structure can also be selected in a manner which is optimized in terms of stress and load. As a result, an improvement of the rigidity and the mechanical load-bearing capability of the gearwheel can be brought about.

In accordance with one preferred embodiment, the transition geometry of the respective transition region can be configured in each case in such a way that the respective transition region has a concave curvature in the direction of the respective tooth or the tooth base.

In this way, the transition region can be formed, for example from outside, as a surface which is concavely curved (and is preferably exposed to the outside) towards the teeth or the tooth base between the teeth, the supporting structure and/or the tooth base (in a top view of the tooth base). In this way, furthermore, a particularly advantageous deflection of the force flow from the teeth or from the tooth base to the supporting structure can take place, with the result that the load-bearing capability and the service life can be increased further with an unchanged strength of the gearwheel.

In accordance with a further preferred embodiment, the gearwheel can have a toothing system for the transmission of power to a further gearwheel (of a gearwheel mechanism). Here, the teeth of the gearwheel can be provided in such a way that they form a spur gear toothing system, a helical toothing system, a curved toothing system or a hypoid toothing system of the gearwheel.

Furthermore, the gearwheel can be a bevel gear or bevel gearwheel. The gearwheel body can preferably be configured as a truncated cone. The latter can preferably extend along the rotational axis between two end faces and can further preferably have a cone angle which is defined with regard to the rotational axis of from 35 degrees to 70 degrees.

In this way, the gearwheel can be used for a multiplicity of different applications and uses, and the production of the gearwheel can be simplified.

The gearwheel can preferably be configured in such a way that it is fully in engagement with an identically configured gearwheel in the case of meshing.

This refinement can ensure, in particular, that the two gearwheels can interact in a positively locking manner for the transmission of power, and, in particular, no structures of the gearwheel prevent meshing.

The gearwheel body can further preferably have a fastening opening on at least one of the two end faces. Here, the fastening opening can preferably be configured as a through opening which can preferably have a defined internal profile for a shaft/hub connection, such as, for example, a splined shaft profile. Here, the fastening opening can preferably extend along the rotational axis.

In this way, the gearwheel can be connected in a particularly simple and reliable manner to drive shafts or output shafts. In addition, it can be achieved in this way that the gearwheel can be used for a multiplicity of different applications.

To this end, the gearwheel can preferably also have a shank-shaped or tubular connector section. An embodiment of this type can be advantageous, for example, in the case of an axle shaft gear. The abovementioned connector types are purely exemplary, however, and any desired further connector possibilities are also conceivable.

A further aspect of the present invention relates to a differential gear. The latter has at least one gearwheel in accordance with the first aspect of the invention. The said at least one gearwheel can preferably be provided as a differential bevel gear, a compensating bevel gear or an axle shaft gear. The rotational axis of the gearwheel can preferably enclose an angle of from 40 to 100 degrees, in particular 90 degrees, with the rotational axis of a corresponding mating gearwheel (in the case of meshing).

In this way, a differential gear can be provided, in the case of which all of the advantages which were mentioned for the gearwheel according to the invention are likewise achieved. In particular, a higher power output can be transmitted by way of the differential gear with an unchanged service life and stability, without registering a weight increase and/or an increase in the inertia of the differential gear at the same time.

Further refinements and advantages of the present invention will be described on the basis of the following exemplary embodiments in conjunction with the figures of the accompanying drawings.

BRIEF DESCRIPTION OF THE DRAWINGS

FIGS. 11A to 11G show simplified diagrammatic illustrations for possible transmission geometries; in each case in a side view at the top and in a perspective manner at the bottom.

DETAILED DESCRIPTION

FIGS. 1 to 10 show different views of one exemplary embodiment of the gearwheel 100 according to the invention.

Figure 1:
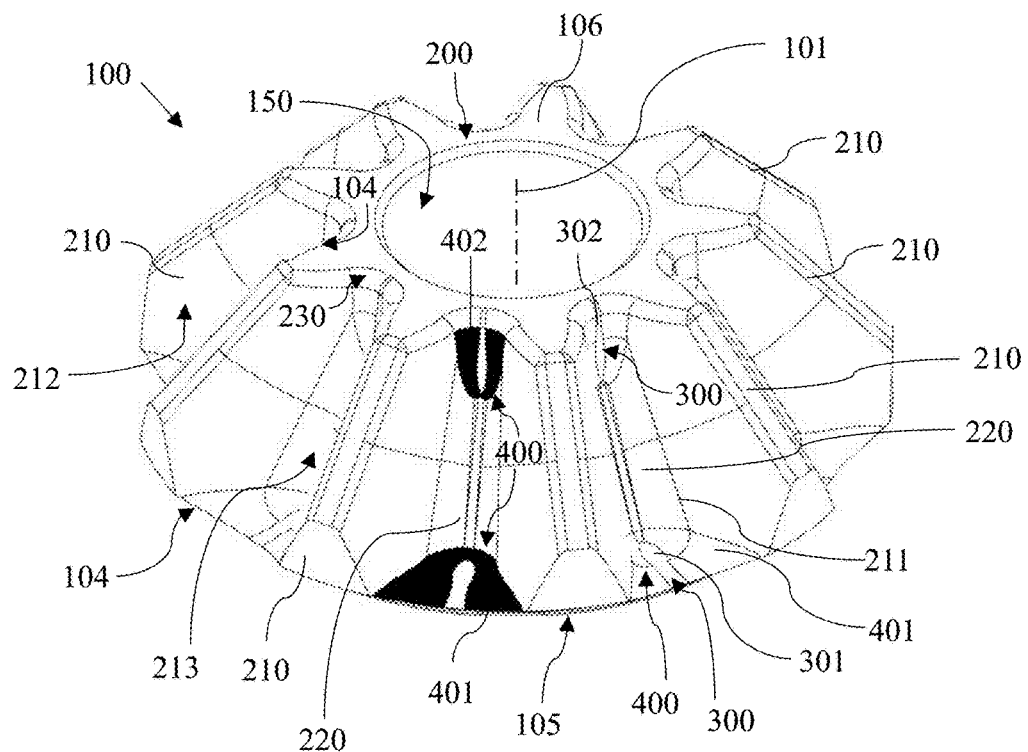
FIG. 1 shows a perspective illustration of a gearwheel in accordance with one embodiment of the invention, in which important aspects of the invention are highlighted.
Figure 2:
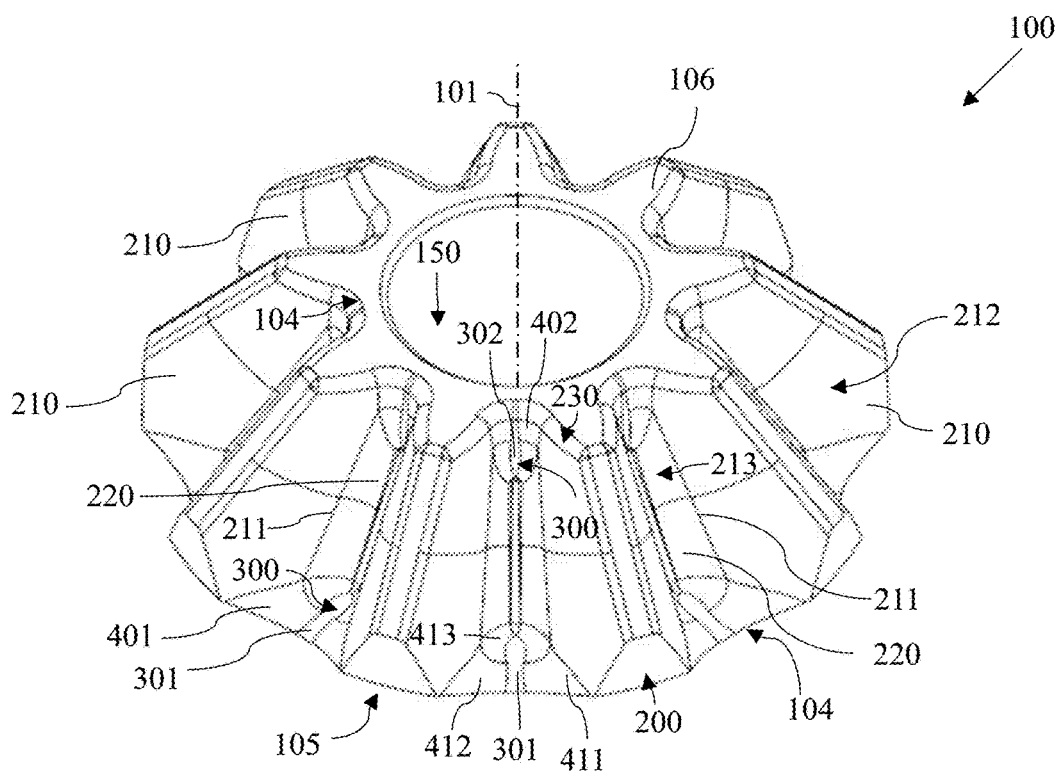
FIG. 2 shows a further perspective illustration of the gearwheel from FIG. 1 from a slightly different viewing angle in comparison with the viewing angle from FIG. 1.
Figure 3:
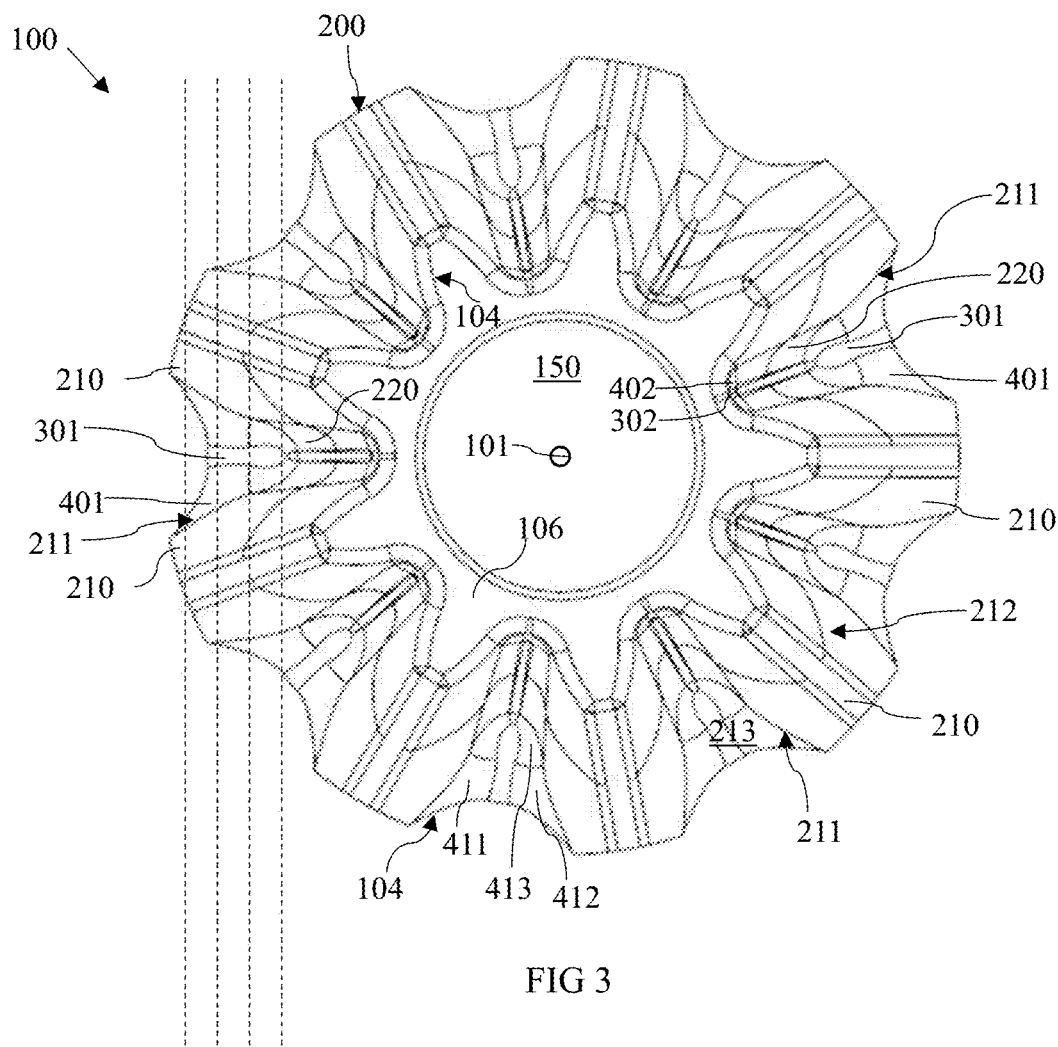
FIG. 3 shows a top view of the gearwheel from FIG. 1, and sectional line markings for the sectional illustrations of FIGS. 5 to 8.
Figure 4:
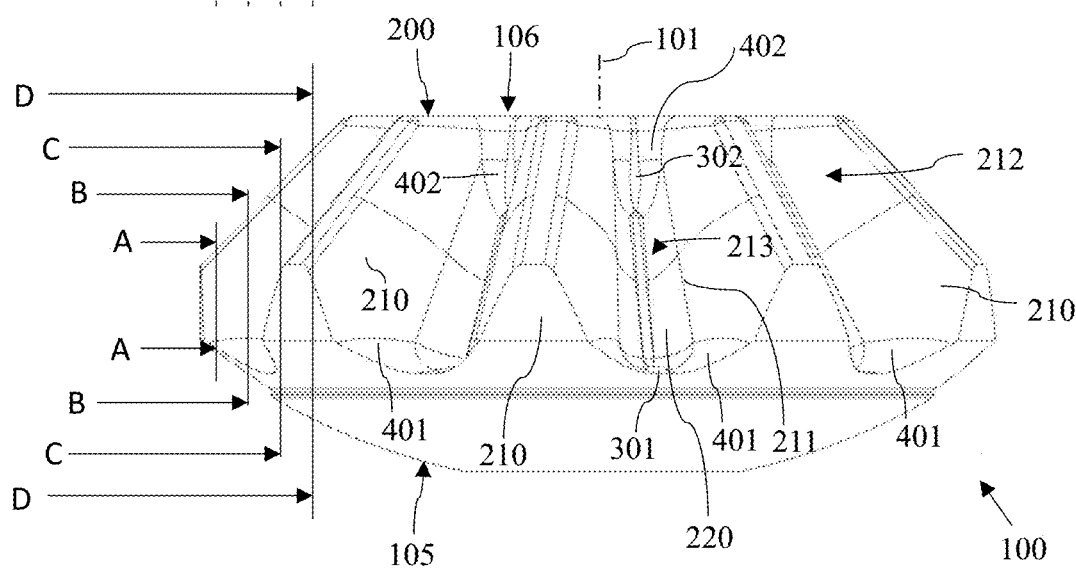
FIG. 4 shows a side view of the gearwheel from FIG. 1, and sectional line markings for the sectional illustrations of FIGS. 5 to 8.
Figure 5:
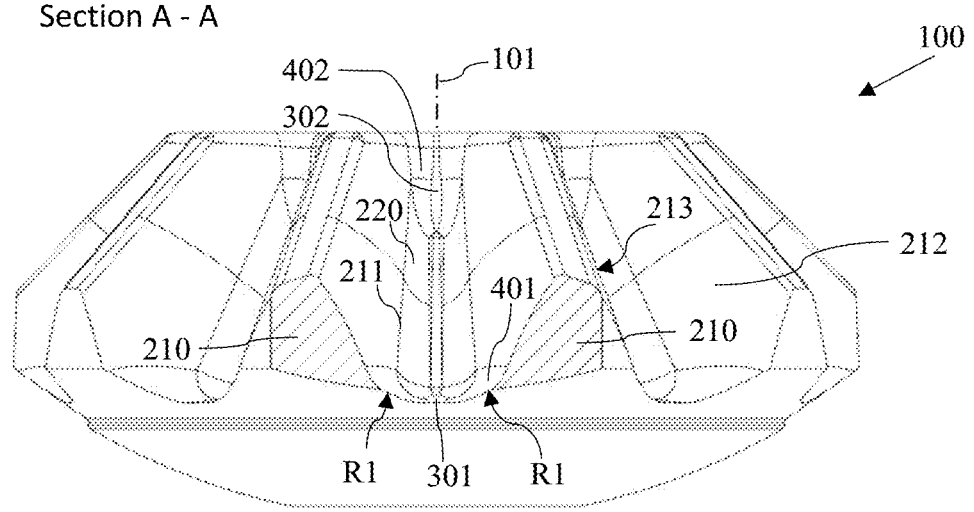
FIG. 5 shows a side view of the gearwheel from FIG. 1 along the sectional line A-A which is shown in FIGS. 3 and 4.
Figure 6:
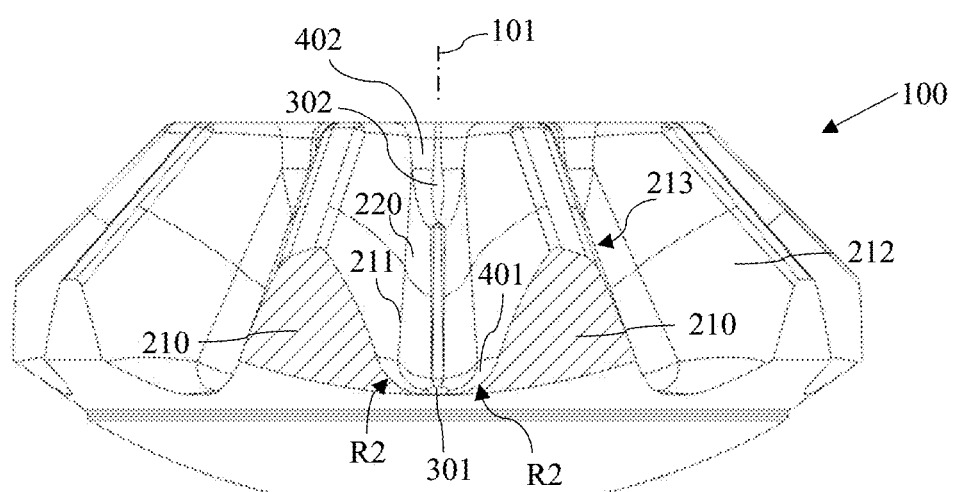
FIG. 6 shows a side view of the gearwheel from FIG. 1 along the sectional line B-B which is shown in FIGS. 3 and 4.
Figure 7:
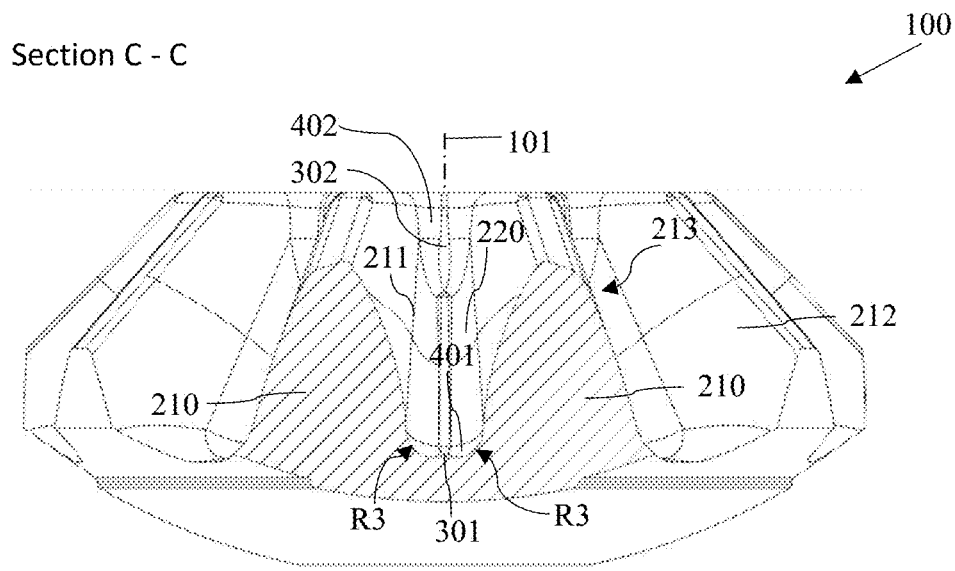
FIG. 7 shows a side view of the gearwheel from FIG. 1 along the sectional line C-C which is shown in FIGS. 3 and 4.
Figure 8:
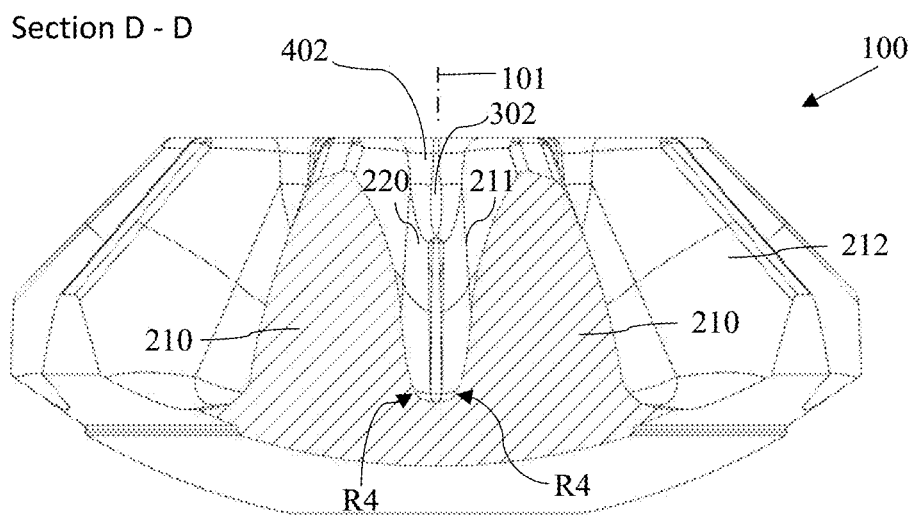
FIG. 8 shows a side view of the gearwheel from FIG. 1 along the sectional line D-D which is shown in FIGS. 3 and 4.

The gearwheel 100 has a rotational axis 101. The orientation of the gearwheel 100 in its operating position can preferably be fixed by way of the rotational axis 101. FIGS. 1 and 2 in each case show by way of example an alignment of the gearwheel 100 in the case of an identical orientation along the rotational axis 101. The gearwheel 100 can preferably be of rotationally symmetrical configuration about the rotational axis 101, as shown, for example, in FIGS. 1 to 8.

The gearwheel 100 can be provided for the transmission of power to a mating gearwheel of a gearwheel mechanism. In particular, the gearwheel 100 can be provided, for example, as a bevel gear, a compensating bevel gear or an axle shaft gear for a differential gear of a motor vehicle. To this end, the gearwheel 100 can preferably have a toothing system for the transmission of power. Here, the gearwheel wo can preferably have a spur gear toothing system, a helical toothing system or a curved toothing system. In FIGS. 1 to 10, the gearwheel 100 is shown by way of example with a spur gear toothing system.

To this end, the gearwheel 100 has a gearwheel body 200 with teeth 210 which are arranged distributed around the rotational axis 101. The teeth 210 can preferably be arranged distributed uniformly over the circumference of the gearwheel 100. FIGS. 1 to 8 show this, for example.

The gearwheel body 200 can preferably extend along the rotational axis 101 between a first end face 105 and a second end face 106, as shown by way of example in FIGS. 1 to 8 and 10. The end faces 105, 106 can be provided parallel to one another, and can be at a defined spacing from one another. The end faces 105, 106 can be delimited radially with regard to the rotational axis 101 by way of a virtual circle with a circle diameter in the range from 60 mm to 180 mm.

FIGS. 1 to 10 show the gearwheel wo by way of example as a bevel gearwheel. The gearwheel body 200 can be configured as a truncated cone. Here, the gearwheel body 200 can preferably have a smaller diameter on its upper side than on its lower side. In FIGS. 1 to 10, by way of example, the upper side is formed by the second end face 106 and the lower side is formed by the first end face 105.

Figure 9:
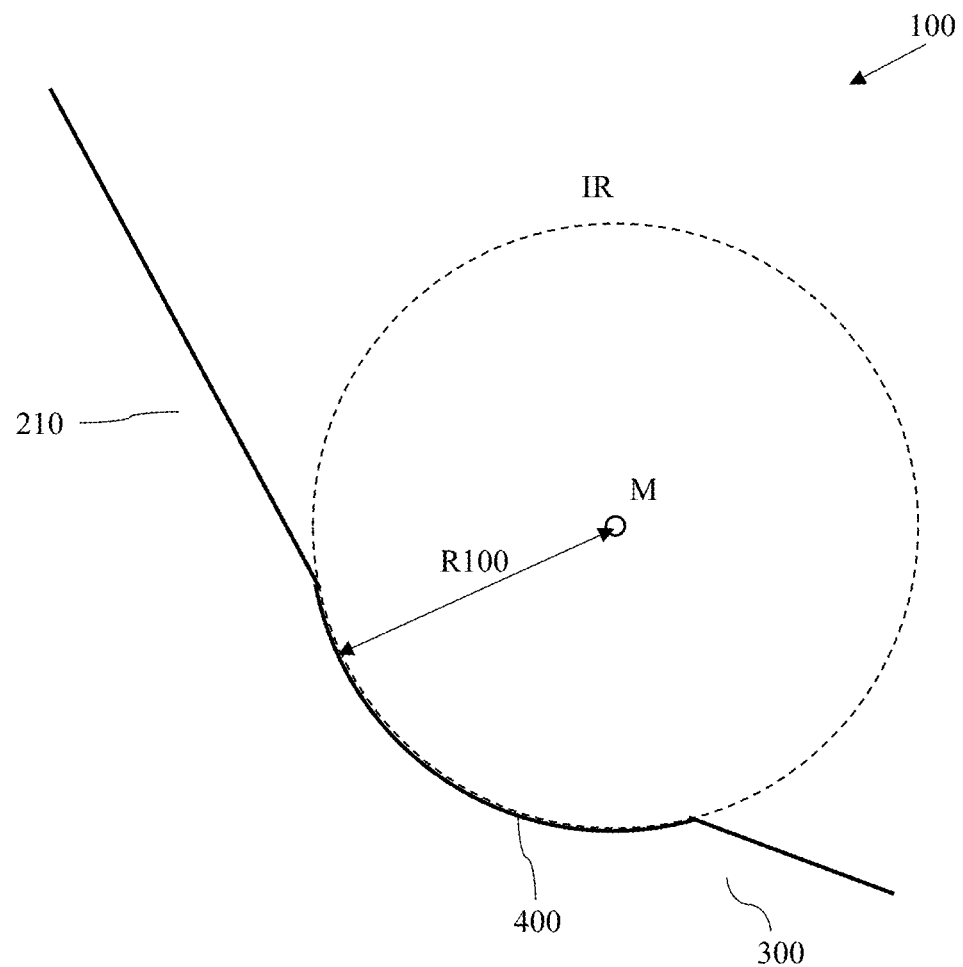
FIG. 9 shows a simplified diagrammatic illustration of a part detail of the gearwheel from FIG. 1.
Figure 10:
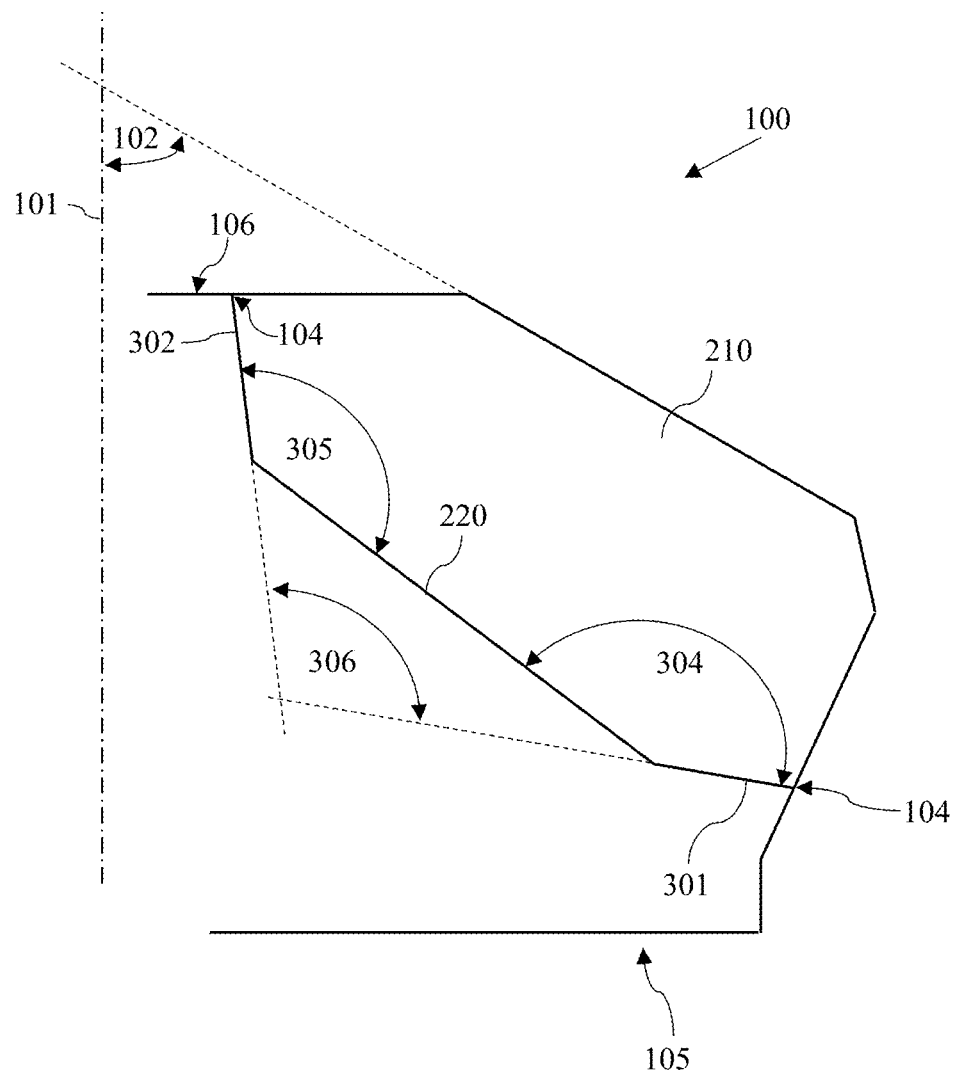
FIG. 10 shows a simplified diagrammatic illustration of a section of the gearwheel from FIG. 1 along the tooth base.

Further preferably, the gearwheel body 200 can have a cone angle 102 (defined relative to the rotational axis 101) of from 35 degrees to 70 degrees, as shown by way of example in FIGS. 1 to 9 and, in particular, in FIG. 10. These exemplary embodiments are not, however, to be considered limiting for the invention, but rather the gearwheel body 200 can be of any desired configuration, for example also as a cylinder. The gearwheel 100 can also be a spur gear, an elliptical gear, a worm gear or a contrate gear.

On at least one of the two end faces 105, 106, the gearwheel body 200 can preferably have a fastening opening 150 for fastening the gearwheel wo to a shaft. Here, the fastening opening 150 can preferably be configured as a through opening and can preferably extend along the rotational axis 101. Furthermore, the fastening opening 150 can have a defined internal profile for a shaft/hub connection. For example, a splined shaft profile can be provided on a section of the inner face of the fastening opening 150.

The gearwheel 210 can have any desired number of teeth 210. The gearwheel 210 which is shown by way of example in FIGS. 1 to 8 has, for example, nine teeth 210.

In each case two adjacent teeth 210 are connected to one another at their tooth roots 211 via a (common) tooth base 220. This is shown by way of example by FIGS. 1 to 8.

The shape of the cross section of the tooth 210 along its extent between the two end faces 105, 106 can preferably be defined by an involute. A covering face rounded portion 230 which runs around with the circumference of the gearwheel can preferably be provided on the second end face 106. The tooth roots 211 are preferably provided on opposite sides of the respective tooth 210. Each of the teeth 210 can preferably likewise have tooth flanks 212 for the transmission of torque on the opposite sides of the respective tooth 210. Each of the tooth flanks 212 can preferably adjoin the respective tooth root 211 directly and can extend radially (with regard to the rotational axis 101) flatly to the outside from the said tooth root 211. This is shown by way of example in FIGS. 1 to 8. In a top view of the gearwheel 100, for example, the tooth base 220 can have a concave shape to the gearwheel centre and/or a U-shape or V-shape which is substantially open to the outside. A tooth engagement space 213 can preferably be delimited in each case between the respective adjacent teeth 210 and the tooth base 220, in which tooth engagement space 213 a tooth, corresponding to the profile of the tooth 210, of a mating gearwheel can preferably be received (for the transmission of power). A tooth gap of the gearwheel 100 can preferably be formed by way of the respective adjacent teeth 210 and the tooth base 220. The gearwheel 100 can preferably have a tooth gap cross section transversely with respect to the extent of the tooth base 220 (in the axial and/or radial direction with regard to the rotational axis 101), which tooth gap cross section is substantially U-shaped, V-shaped or parabola-shaped. This is shown by way of example in FIGS. 1 to 8.

The tooth base 220 can preferably extend between the first end face 105 and the second end face 106, and can preferably be delimited by way of the tooth roots 211 of two adjacent teeth 210.

Furthermore, the gearwheel wo has a supporting structure 300, in order, for example, to increase the rigidity of the gearwheel 100 during operation. In each case one tooth gap which is formed between the teeth 210 can preferably have the supporting structure 300. The supporting structure 300 can preferably be configured integrally with the gearwheel body 200. This is shown by way of example in FIGS. 1 to 8 and 10.

At at least one or both axial (with regard to the rotational axis 101) ends of the respective tooth base 220, the supporting structure 300 has a supporting region 301, 302. For example, FIGS. 1 to 8 and 10 show (per tooth gap) a first supporting region 301 which is provided on the first end face 105 and a second supporting region 302 which is provided on the second end face 106. Here, the supporting structure 300 can be formed by way of the two supporting regions 301, 302.

If, for example, the gearwheel body 200 is configured as a truncated cone, the supporting structure 300 can preferably have the supporting region 301, 302 at that axial end of the tooth base 220, at which the gearwheel body 200 has the smaller or the greater diameter, with the result that, for example, the supporting region 301, 302 is provided (merely) on the lower side or the upper side, respectively, of the gearwheel body. In FIGS. 1 to 10, the supporting regions 301, 302 are provided by way of example at the two axial ends of the tooth base 220.

The respective supporting region 301, 302 extends away from the tooth base 220 between the respective adjacent teeth 210. This is shown by way of example in FIGS. 1 to 8 and 10.

Here, the respective supporting region 301, 302 can preferably change its size steadily and/or continuously, for example can decrease and/or increase, axially (with regard to the rotational axis 101) away from that axial end of the tooth base 220 which has the said respective supporting region 301, 302 towards the opposite axial end. This is shown by way of example in FIGS. 1 to 8 and 10, in which, for example, the supporting region 301 first of all decreases continuously as the axial (with regard to the rotational axis 101) spacing from the first end face 105 increases, then increases continuously in size again in its extent in the circumferential direction, before it decreases again (as it increasingly approaches the tooth base 220). The second supporting region 302 can, for example, widen with an increasing axial spacing from the second end face 106, before it decreases again (as it increasingly approaches the tooth base 220).

The respective supporting region 301, 302 can axially (with regard to the rotational axis 101) away from that axial end of the tooth base 220 which has the said supporting region 301, 302 towards the opposite axial end over a length of at most a third of the axial length of the tooth base 220. As an alternative or in addition, the respective supporting region 301, 302 can extend axially (with regard to the rotational axis 101) away from that axial end of the tooth base 220 which has the said supporting region 301, 302 towards the opposite axial end over a length of at most a quarter of the length of the tooth base 220. This is shown by way of example by FIGS. 1 to 8 and 10.

The supporting structure 300, preferably the respective supporting region 301, 302, can preferably extend (axially) from the respective axial end of the tooth base 220 between the teeth 210 and/or along the tooth base 210. In particular, the supporting structure 300 can extend from the one axial end of the tooth base 220 towards its other axial end. The respective supporting region 301, 302 can preferably extend flatly between the respective adjacent teeth 210.

The respective supporting region 301, 302 can be provided at the corresponding axial end of the tooth base 220 in such a way that a circumferential edge 104 of the gearwheel 100, which circumferential edge 104 runs around with the circumference of the gearwheel 100 and is preferably exposed to the outside, is formed jointly by the respective supporting region 301, 302 and by the adjacent teeth 210. This is shown by FIGS. 1 to 8 and 10, for example, for the first supporting region 301.

The respective supporting regions 301, 302 can preferably be provided in each case at a defined angle with regard to the tooth base 220. This is shown by way of example in FIG. 10.

Here, the first supporting region 301 can preferably be provided at a first supporting region angle 304 in the range from 100 to 170 degrees with regard to the tooth base 220. Further preferably, the second supporting region 302 can be provided at a second supporting region angle 305 in the range from 110 to 170 degrees with regard to the tooth base 220. The respective supporting regions 301, 302 can preferably be provided on the gearwheel 100 in such a way that they are inclined with respect to one another at a supporting angle 306 to one another in the range from 20 to 160 degrees, particularly preferably 100 degrees. This is shown by way of example in FIG. 10.

The supporting regions 301, 302 are connected directly to the adjacent teeth 210 and the tooth base 220 by way of in each case one transition region 400-402. Here, the respective transition region 400-402 surrounds the corresponding supporting region 301, 302 at least partially and in a contiguously extending manner. This is shown by way of example in FIGS. 1 to 8. In FIG. 1, the transition regions 400-402 are highlighted in colour for clarification purposes.

FIGS. 1 to 8 show that, for example, the transition region 400-402 can at least partially delimit the supporting structure 300, preferably the respective supporting region 301, 302. Here, the circumferential edge 104 which runs around with the circumference of the gearwheel 100 and is exposed to the outside can be formed jointly by the respective supporting region 301, 302, the respective transition region 400-402 and by the adjacent teeth 210. The respective transition region 400-402 can preferably extend, preferably in each case flatly together with the respective supporting region 301, 302.

The transition region 400-402 can preferably have a substantially U-shape, V-shape and/or parabola shape. The shape of the respective transition region 400-402 can preferably be open toward that axial end of the tooth base 220 which has the respective transition region 400-402, towards the radial (with regard to the rotational axis 101) outer circumference of the gearwheel wo and/or towards the circumferential edge 104.

For example, as shown in FIGS. 1 to 8, the transition region 400, 401 can have a first section 411 for the direct connection between the associated supporting region 301 and a first one of the adjacent teeth 210. Furthermore, the transition region 400, 401 can have a second section 412 for the direct connection between the associated supporting region 301 and a second one of the adjacent teeth 210. In addition, the transition region 400, 401 can have a third section 413 which connects the first and second section 411, 412 for the direct connection between the supporting region 301 and the tooth base 220 which connects the first and second tooth 210.

Therefore, for example, the transition region 400 can be provided with an extent which is contiguous over the sections 411-413, and at the same time can surround the respective supporting region 301 at least partially here.

Here, on account of the rotational symmetry of the gearwheel 100 about the rotational axis 101, the transition region 400 can be of symmetrical configuration with regard to the supporting structure 300. Therefore, the transition region 400 can preferably extend, for example, from the circumferential edge 104 between one of the respective teeth 210 and the supporting structure 300 along the supporting structure 300 and the said tooth 210 to the tooth base 220, and can run from there correspondingly back along the supporting structure and the corresponding other tooth 210 to the circumferential edge 104. This is shown by way of example by FIGS. 1 to 8, but the transition region 400-402 can also have other shapes in a top view.

As viewed in the direction of its extent, the transition region 400-402 has a transition geometry in cross section. FIGS. 5 to 9 show examples of the transition geometry by way of example.

The transition geometry can have at least one (or else only a single or else also a plurality of) geometry section/sections.

For example, the transition geometry or the geometry section can be a rounded portion, such as a radius or a concave curvature, as shown in FIGS. 5 to 9, for example. As an alternative or in addition, it is also conceivable, furthermore, that the transition geometry or the geometry section is a bevelled edge, such as a chamfer, or a sectional line which is defined in accordance with its shape. For example, the sectional line can follow a differentiable function or a polynomial function. Furthermore, it is also conceivable, in particular, that the transition geometry can preferably have a rounded portion (produced by means of a radius) of a chamfer. FIGS. 1 to 9 show the transition geometry, for example, in each case by way of a radius, that is to say by way of a rounded edge, which merges, for example, tangentially into the tooth root 211 or the tooth base 220. The transition geometry of the respective transition region 400-402 can preferably have substantially the same geometry sections over the entire extent.

The transition geometry of the respective transition region 400-402 can preferably be configured in each case in such a way that the respective transition region 400-402 has a concave curvature in the direction of the respective tooth 210 or the tooth base 220.

Between one of the respective teeth 210, the supporting structure 300 and the tooth base 220, the transition region 400-402 can preferably have a surface which is exposed to the outside and is curved concavely towards the teeth 210 or the tooth base 220 in a top view of the tooth base 220. A surface transition both from the tooth base 220 to the supporting structure 300 and from the teeth 210 to the supporting structure 300 can be formed by way of this exposed surface, as shown by FIGS. 1 to 9, for example.

For example, a spacing in cross section which exists in the axial direction of extent and, transversely with respect thereto, along the direction of extent of the respective transition region 400 between the supporting structure 300 and a tooth 210, in particular a tooth flank 212, and/or the tooth base 220 can be bridged by way of the transition region 400. The spacing can preferably be bridged in both directions by way of a correspondingly selected geometry section, as shown in FIGS. 5 to 9, for example. In particular, FIG. 9 shows by way of example the use of a radius in the transition geometry to the edge rounding portion, the said radius (in the sense of a geometry section) having a radius R100 as a spacing between the transition geometry and the centre point M of an imaginary circle IR which is used to this end. It becomes clear by way of example from FIG. 9, in particular, that the design of the transition geometry has an influence on the force flow between the respective tooth 210 and the supporting structure 300, since, for example, the structure transition can be set to be correspondingly more gentle or more flowing. In this way, for example, a notch effect which emanates from the supporting structure 300 can be prevented by way of a defined profile design of the transition geometry.

Here, per supporting region 301, 302, a geometric variable of this transition geometry preferably changes (varies) in a steady manner along an axial and/or radial direction with regard to the rotational axis 101.

Here, the geometric variable can be a curvature extent, a radius R1-R4, R100, and/or a width or an angle of a bevelled edge, in particular a chamfer. The geometric variable can preferably be at least one radius and/or one chamfer.

In particular, the abovementioned geometry sections of the transition geometry can be defined by way of the geometric variable.

In this way, the transition geometry of the gearwheel 100 can be configured in such a way that, during operation, the rigidity of the gearwheel 100 is increased and the stresses which occur during operation are reduced in comparison with a gearwheel which has a substantially constant geometric variable along an axial and/or radial direction with regard to the rotational axis 101.

The geometric variable can change in an equally steady and continuous manner, for example, along the axial and/or radial direction with regard to the rotational axis 101 on both sides of the respective supporting region 301, 302, that is to say, for example, on opposite sides with regard to the respective supporting region 301, 302.

FIGS. 1 to 8 and 10 show by way of example that a radius which has been selected for the transition geometry of the transition region 401 as a geometry section can decrease towards the centre of the gearwheel in a predominantly radial direction but also with a small directional component in the axial direction. Thus, for example, the geometric variable can preferably decrease continuously along the direction of the extent from the first section 411 towards the third section 413. At the same time, the geometric variable, such as, for example, the magnitude of a radius, can also preferably decrease continuously along the direction of the extent from the second section 412 towards the third section 413. Here, the direction of the extent of the transition region 401 can be fixed, for example, by way of the (main) directions of extent of the respective first to third section 411-413 which run, for example, substantially along/with the corresponding tooth root 211 or the axial end of the tooth base 220 (in a directed manner). Here, the geometric variable can also change continuously on a connecting section of the respective first or second section 411, 412 to the third section 413. In this way, it can be achieved, in particular, that the change of the geometric variable runs in a continuous and steady manner per connecting region 400. In this way, it can be achieved, for example, that the geometric variable decreases in a continuous and steady manner from the outside towards the gearwheel centre.

This can also be found correspondingly for the other transition region 402 in the exemplary illustrations of FIGS. 1 to 8 and 10. It is shown by way of example here that a radius which has been selected for the transition geometry of the transition region 402 as a geometry section can decrease towards the centre of the gearwheel in a predominantly axial direction but also with a small directional component in the radial direction.

In other words, the geometric variable can therefore increase in each case, for example, with an axially (with regard to the rotational axis 101) decreasing spacing from the two axial ends of the gearwheel 100. This is shown by way of example in FIGS. 1 to 8 and 10. In this way, for example, a transition from the respective tooth 210 to the supporting structure 300 can take place in as gentle a manner as possible.

Here, for example, radii with a radius (linear dimension) R1-R4 in the range of from more than 0 mm, in particular more than 0.1 mm, to 10 mm can preferably be used as a respective geometry section. As an alternative or in addition, for example, chamfers with a chamfer angle in the range from 20 degrees to 70 degrees can be used as a respective geometry section.

In particular, FIGS. 5 to 8 show that, for example, none of the radii R1-R4 is preferably of identical magnitude in an axial and/or radial direction with regard to the rotational axis 101.

Furthermore, in particular, the radius R1 which is at the smallest axial (and radial) spacing from the corresponding axial end of the gearwheel 100 can be provided as the greatest in relation to the radii which are further remote therefrom, such as, for example, the radii R2-R4. The radii can then be decreased correspondingly, for example, at an increasing spacing from the respective axial end of the gearwheel 100.

Here, in relation to the starting radius R1, the radius R2 can have a ratio R1/R2 in the range from at least 1 to (at most) 3, the radius R3 can have a ratio R1/R3 in the range from at least 1 to (at most) 10, and/or the radius R4 can have a ratio R1/R4 in the range from at least 1 to (at most) 1000. The respective radius ratio can preferably be fixed by way of a mathematical function, such as, for example, a hyperbolic function.

The teeth 210 can preferably be provided on the gearwheel body 200 in such a way that in each case adjacent teeth 210 are spaced apart from one another in a variable manner along the rotational axis 101. Here, the transition region 400-402 can be configured in such a way that the magnitude of the geometric variable along an axial and/or radial (with regard to the rotational axis 101) direction is dependent on the gap width between the teeth 210, it preferably being possible for the geometric variable to be increased or decreased (but preferably not remain constant) with an increasing spacing of the adjacent teeth 210 from one another. As an alternative or in addition, it is of course also conceivable that the transition region 400-402 can preferably be configured in such a way that the geometric variable changes (viewed globally) with an increasing spacing of the adjacent teeth 210 from one another, but sections of the transition region 400-402 also exist, (which sections, for example, adjoin sections with a changing geometric variable, and) in which sections the geometric variable is/remains constant or in which sections it has the same magnitude.

Figure 12:
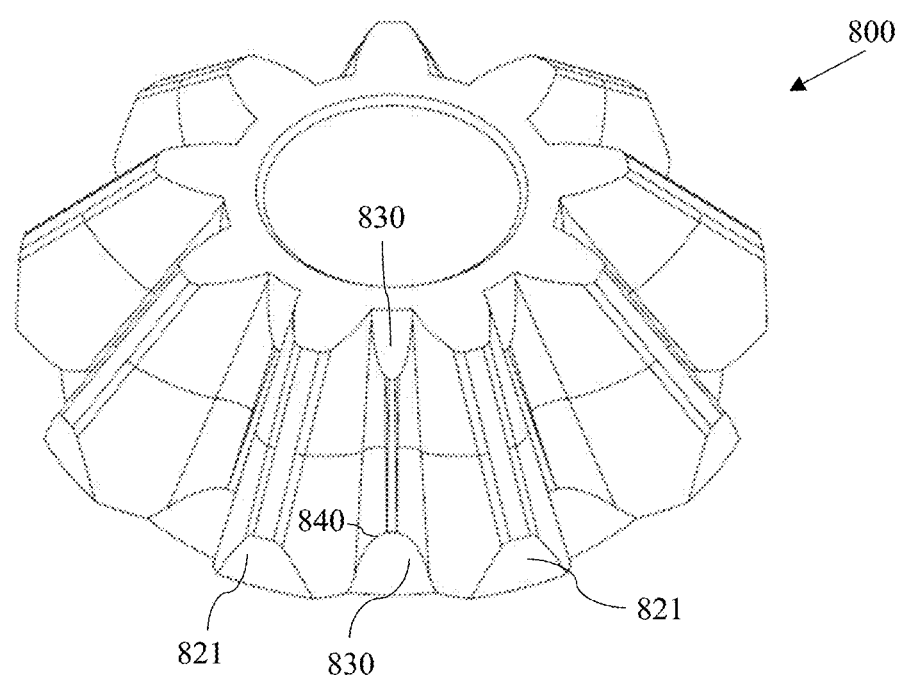
FIG. 12 shows a perspective illustration of a bevel gearwheel which is known from the prior art.

Further preferably, the geometric variable can be a curvature extent of the respective geometry section. Here, the curvature extent can increase in a continual/steady and/or continuous manner starting from the respective axial end of the gearwheel 100 as it increasingly approaches the tooth base 220 (in terms of axial position with regard to the rotational axis 101), with the result that improvement of the force flow from the teeth 210 to the supporting structure 300 can preferably be achieved along a virtual edge between the supporting structure 300 and the teeth 210 or the tooth base 220. The abovementioned virtual edge can be shown by way of example in FIG. 12 by way of the contour 840.

FIGS. 11A to 11G show examples for possible embodiments of the transition region 400. These are purely by way of example, and any other further desired embodiments are also conceivable.

Figure 11A:
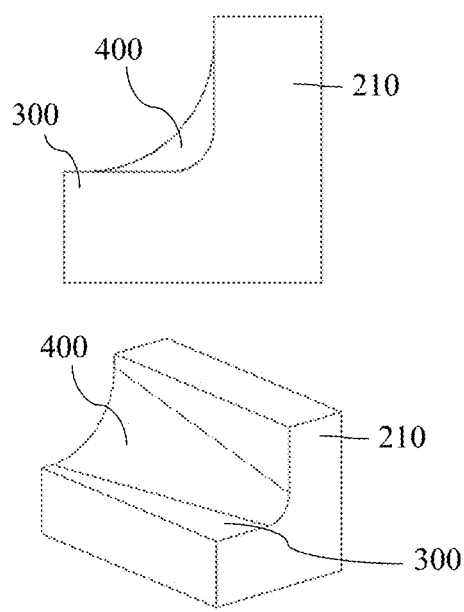

FIG. 11A shows by way of example the transition region 400 which has a transition geometry which has a radius as single geometry section. Here, the magnitude or the size of the radius, that is to say the radius of the radius, changes in FIG. 11A along the axial and/or radial direction with regard to the rotational axis 101. In the example of FIG. 11A, the radius (as size dimension) preferably changes here in a steady and continuous manner.

Figure 11B:
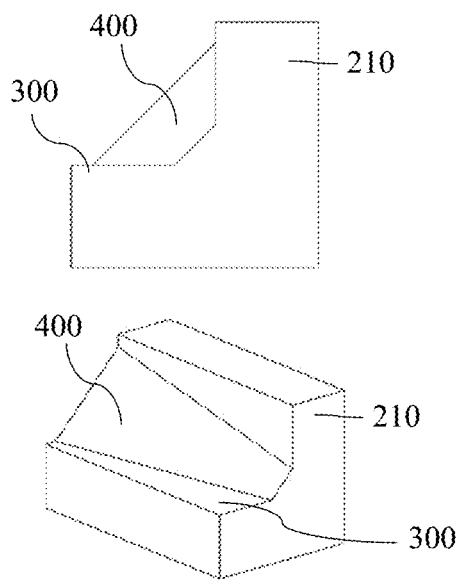

FIG. 11B shows by way of example the transition region 400 which has a transition geometry which has a chamfer as single geometry section. It is shown by way of example here in FIG. 11B that the width of the chamfer preferably changes in a steady and continuous manner along the axial and/or radial direction with regard to the rotational axis 101.

Figure 11C:
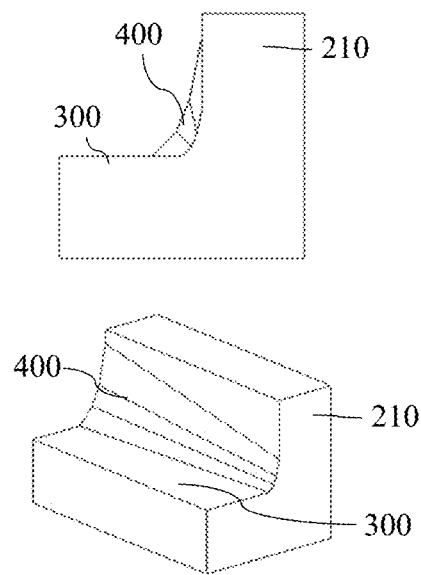

FIG. 11C shows by way of example that the transition geometry of the transition region 400 can also have geometry sections with a plurality of chamfers of different configuration. As shown by way of example, the width of the chamfers which are provided in the respective geometry sections can preferably be changed here in a steady and continuous manner along the axial and/or radial direction with regard to the rotational axis 101.

FIGS. 11D to 11G show by way of example that the transition geometry of the transition region 400 can also be composed of a plurality of geometry sections with different geometry design elements. In the figures, for example, the transition geometry has at least one geometry section with a radius and at least one geometry section with a chamfer.

Here, in FIG. 11D, only the width of the geometry section which has the chamfer changes, whereas the radius of the two geometry sections which in each case have a radius remains constant. In FIG. 11E, both the width of the chamfer and the size (that is to say, the radius) of the respective radii change. In FIGS. 10 and 11G, at least one width of the respective chamfers and/or at least one radius of individual radii (or else of all the radii) can optionally change.

It goes without saying that, as viewed in the context of a steady change over the entire region, in each case individual sections without a change can also be contained or present. This is not shown explicitly for reasons of clarity within the context of the exemplary illustrations of FIGS. 11A to 11G, but is also included in the invention.

It becomes clear from what has been stated above, in particular, that virtually any desired number of configurations of the gearwheel 100 can be achieved by way of the configuration according to the invention of the transition region 400. This makes it possible, for example, that a particularly advantageous configuration of the gearwheel 100 can be selected in a manner which is dependent on the respective application.

The gearwheel 100 can preferably be produced from metal, such as, for example, cast iron, steel or aluminium. As an alternative or in addition, the gearwheel 100 can also be produced from a plastic or a ceramic.

At least parts of the surface of the gearwheel 100 can preferably have been treated by way of a surface treatment. Here, the transition region 400 and the supporting structure 300 can preferably in each case have different hardnesses, for example on account of different hardness depths.

A further aspect of the invention relates to a gear mechanism, such as a differential gear, which has at least one abovementioned gearwheel wo according to the invention. The gear mechanism is not shown in the figures, but is readily comprehensible to a person skilled in the art even without an illustration.

The present invention is not restricted by way of the above-described exemplary embodiments, in so far as it is included in the subject matter of the following claims.

In particular, all the features of the exemplary embodiments can be combined with and swapped for one another in any desired way.

The invention claimed is:

1. Gearwheel with a rotational axis having a gearwheel body with teeth which are arranged distributed around the rotational axis, in each case two adjacent teeth being connected to one another at their tooth roots via a tooth base, and a supporting structure which has a supporting region at at least one or both axial, with regard to the rotational axis, ends of the respective tooth base, which supporting region extends away from the tooth base between the respective adjacent teeth, the supporting region being connected directly to the adjacent teeth and the tooth base in each case by way of a transition region, the respective transition region surrounding the supporting region in a manner which extends at least partially and contiguously, and having a transition geometry in cross section as viewed in the direction of its extent, a geometric variable of the transition geometry changing steadily, per supporting region, along an axial or radial direction with regard to the rotational axis, and the transition region having a first section for the direct connection between the respective supporting region and a first one of the adjacent teeth, a second section for the direct connection between the supporting region and a second one of the adjacent teeth, and a third section which connects the first section and the second section for the direct connection between the supporting region and the tooth base which connects the first and second teeth.

2. Gearwheel according to claim 1, the transition geometry having at least one geometry section which is defined by way of the geometric variable, or the transition geometry or the geometry section being a rounded portion having a radius, or a rounded portion having a concave curvature, or a beveled edge, or a sectioned boundary which is defined in accordance with a polynomial function, or the transition geometry having at least one chamfer.

3. Gearwheel according to claim 1, the geometric variable being a curvature extent, a radius, or a width or an angle of a beveled edge.

4. Gearwheel according to claim 1, the respective transition region being configured in such a way that there is a steady change of the geometric variable over the entire transition region as viewed along the axial or radial direction with regard to the rotational axis, the transition region having at least one part section along the axial or radial direction, in which part section the geometric variable of the transition geometry of the transition region remains constant.

5. Gearwheel according to claim 1, the geometric variable changing equally, steadily or continuously, decreasing, along the axial or radial direction with regard to the rotational axis.

6. Gearwheel according to claim 1, the transition region having substantially a U-shape, parabola shape or V-shape which is open towards that axial end of the tooth base which has the transition region or, with regard to the rotational axis, towards a radial outer circumference of the gearwheel.

7. Gearwheel according to claim 1, the geometric variable decreasing continuously along the direction of the extent from the first section towards the third section, and the geometric variable decreasing continuously along the direction of the extent from the second section towards the third section, or the geometric variable also changing continuously in each case at a connecting section of the respective first and second section to the third section.

8. Gearwheel according to claim 1, the geometric variable of the transition geometry of the respective transition region changing equally or steadily along the axial or radial, with regard to the rotational axis, direction on sides which lie opposite one another with regard to the respective supporting region.

9. Gearwheel according to claim 1, the respective supporting region changing steadily and/or continuously in terms of its size axially, with regard to the rotational axis, away from that axial end of the tooth base which has the supporting region towards an opposite axial end.

10. Gearwheel according to claim 1, the respective supporting region extending axially, with regard to the rotational axis, away from that axial end of the tooth base which has the supporting region towards an opposite axial end over a length of at most a third of the axial length of the tooth base or at most a quarter of the axial length of the tooth base.

11. Gearwheel according to claim 1, the respective supporting region extending flatly between the respective adjacent teeth.

12. Gearwheel according to claim 1, the respective supporting region being provided at the corresponding axial end of the tooth base in such a way that a circumferential edge of the gearwheel, which circumferential edge runs around with a circumference of the gearwheel and is exposed to the outside, is formed jointly by the respective supporting region by the transition region, and by the adjacent teeth.

13. Gearwheel according to claim 1, the transition geometry of the respective transition region being configured in each case in such a way that the respective transition region has a concave curvature in the direction of the respective tooth or the tooth base.

14. Gearwheel according to claim 1, the gearwheel body being configured as a truncated cone which extends along the rotational axis between two end faces and further has a cone angle which is defined with regard to the rotational axis of from 35 degrees to degrees, the gearwheel body having a fastening opening on at least one of the two end faces, the fastening opening being configured as a through opening, with a defined internal profile for a shaft/hub connection being a splined shaft profile, the fastening opening extending along the rotational axis.

15. Differential gear having at least one gearwheel according to claim 1, the at least one gearwheel being provided as a compensating bevel gear or an axle shaft gear.

16. Gearwheel according to claim 1, the respective supporting region changing steadily and/or continuously in terms of its size, decreasing axially, with regard to the rotational axis, away from that axial end of the tooth base which has the supporting region towards an opposite axial end.

* * * * *